United States Patent
Cai et al.

(10) Patent No.: US 7,630,727 B2
(45) Date of Patent: Dec. 8, 2009

(54) MAP MESSAGE PROCESSING FOR SMS SPAM FILTERING

(75) Inventors: Yigang Cai, Naperville, IL (US); Donna L. McGreal, Chicago, IL (US); Sanjeev Kumar Singh, New Albany, OH (US); Randy Honggang Yang, Qingdao (CN); Li Chun Zhang, Linqing (CN)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 555 days.

(21) Appl. No.: 11/427,350

(22) Filed: Jun. 29, 2006

(65) Prior Publication Data

US 2008/0004048 A1 Jan. 3, 2008

(51) Int. Cl.
*H04W 4/00* (2006.01)
(52) U.S. Cl. .................... 455/466; 455/410; 455/411; 455/423; 455/404.1
(58) Field of Classification Search ................ 455/466, 455/410, 411, 423, 404.1
See application file for complete search history.

(56) References Cited

U.S. PATENT DOCUMENTS

| 6,424,948 | B1 | 7/2002 | Dong et al. |
|---|---|---|---|
| 6,499,023 | B1 | 12/2002 | Dong et al. |
| 2003/0041126 | A1* | 2/2003 | Buford et al. ............ 709/220 |
| 2003/0053615 | A1 | 3/2003 | Anderson et al. |
| 2005/0020289 | A1* | 1/2005 | Kim et al. ................ 455/466 |
| 2005/0251861 | A1* | 11/2005 | Cunningham et al. ...... 726/23 |
| 2006/0041622 | A1 | 2/2006 | Qutub et al. |
| 2006/0105750 | A1* | 5/2006 | Zabawskyj et al. ...... 455/412.1 |
| 2008/0004046 | A1* | 1/2008 | Mumick et al. ........... 455/466 |
| 2008/0077995 | A1* | 3/2008 | Curnyn .................... 726/27 |

FOREIGN PATENT DOCUMENTS

| EP | 1 628 448 B1 | 11/2007 |
|---|---|---|
| EP | 1 689 138 A1 | 8/2008 |
| WO | WO 2004/008701 A1 | 1/2004 |

* cited by examiner

*Primary Examiner*—Joseph H Feild
*Assistant Examiner*—Huy D Nguyen
(74) *Attorney, Agent, or Firm*—Fay Sharpe, LLP

(57) ABSTRACT

Methods and systems are presented for filtering spam MAP SMS messages in an SS7 network, including mobile originated and mobile terminated MAP SMS messaging to mitigate spam-related traffic in the SS7 network. The system includes an anti-spam application (42) running on one or more network servers (40) that receives the MAP messages before routing to any SMSC or MSC, and classify these as spam or good. The good MAP SMS messages are then provided to the corresponding destinations by appropriate SMSC or MSC in the SS7 network, while the spam MAP SMS messages are not delivered to the SMSC.

17 Claims, 8 Drawing Sheets

MAP MESSAGE PROCESSING FOR SMS SPAM FILTERING

BACKGROUND OF THE INVENTION

The present invention is related to filtering Mobile Application Part (MAP) short message service (SMS) messages for spam in signaling system 7 (SS7) mobile communications networks and will be described with specific reference thereto, although it will be appreciated that the invention may have usefulness in other fields and applications, such as other types of SPAM filtering of MAP SMS messages. With the advancements in communication technologies such as the Internet and wireless communications networks, the ability of people to communicate with one another has become seamless and largely ubiquitous. However, these same technological advances have made it easy for advertisers, hackers, etc. to send large amounts of unsolicited messages or spam to communications devices. Most Internet users are unfortunately all-too familiar with spam email and other similar nuisances. In addition to creating difficulties for the end users of such advanced communications systems, spam also occupies service provider resources, wherein spam email and the like has affected the revenue generation capabilities of Internet service providers generally. Further, spam can be used to attempt to defraud unsuspecting users by enticing users to provide credit card or other personal information. Beyond email type of spam, moreover, owners and commercial operators of wireless telecommunications networks must deal with SMS spam, wherein the provision of such short messaging services has heretofore provided another avenue for unscrupulous spammers to propagate spam. In the wireless telecommunications context, like that of the Internet, spam creates an uncomfortable user experience along with increased operational expenses for service providers due at least partially to increased SS7 network message traffic. Prior spam filtering attempts have focused on sorting out spam at the Short Message Service Centers (SMSCs or SMS-Cs) of the network, but this type of approach may be only partially successful in minimizing overall network traffic. Thus, there is a need for improved systems and methodologies for combating spam by which the associated network traffic and user dissatisfaction can be mitigated.

SUMMARY OF THE INVENTION

The following is a summary of one or more aspects of the invention provided in order to facilitate a basic understanding thereof, wherein this summary is not an extensive overview of the invention, and is intended neither to identify certain elements of the invention, nor to delineate the scope of the invention. The primary purpose of the summary is, rather, to present some concepts of the invention in a simplified form prior to the more detailed description that is presented hereinafter. The various aspects of the present invention relate to methods and systems for filtering of spam MAP SMS messages in an SS7 network to mitigate spam-related traffic in the SS7 network. In application to mobile communications networks, the invention facilitates filtering of spam associated with SMS or short messaging prior to involving network SMS centers, MSCs, or other network entities. In this manner, the invention can be successfully employed to mitigate the adverse effects of SMS spam with respect to the end users, while reducing the amount of network traffic associated with such spam.

In accordance with one or more aspects of the present invention, a method is provided for filtering spam SMS messages in an SS7 network, which includes receiving the network MAP messages and providing the MAP messages to an anti-spam application running on a network element, such as one or more network servers. The method further includes determining whether the MAP messages are SMS messages and classifying the MAP SMS messages as spam or good. Thereafter the good MAP SMS messages are provided to the corresponding destinations, while the application does not provide the identified spam to the destination. In this manner, excess traffic associated with SMS spam can be reduced while still shielding the end users from all or at least an identifiable portion of short message spam in SS7 networks.

Further aspects of the invention relate to a system for filtering spam SMS messages in an SS7 network, comprising a network element that receives SMS MAP network messaging and an anti-spam application (ASA) running on the network element. The ASA receives the MAP SMS messages and classifies these as either spam or good prior to the SMS messages being provided to an SMS center (SMSC) or switching element associated with the SS7 network. The application then directs the good MAP SMS messages to their destination and refrains from providing spam MAP SMS messages to their destination. In one possible embodiment, the application includes a first component, such as a rules engine that performs first stage spam filtering to classify the MAP SMS messages as spam, suspected spam or good, and a second component, such as a Bayesian filter component that performs second stage spam filtering on suspected spam messages to classify the messages as spam or good.

BRIEF DESCRIPTION OF THE DRAWINGS

The following description and drawings set forth in detail certain illustrative implementations of the invention, which are indicative of several exemplary ways in which the principles of the invention may be carried out. Various objects, advantages, and novel features of the invention will become apparent from the following detailed description of the invention when considered in conjunction with the drawings. The present invention exists in the construction, arrangement, and combination of the various system components and steps of the method, whereby the objects contemplated are attained as hereinafter more fully set forth, specifically pointed out in the claims, and illustrated in the accompanying drawings in which:

DETAILED DESCRIPTION

Figure 1:
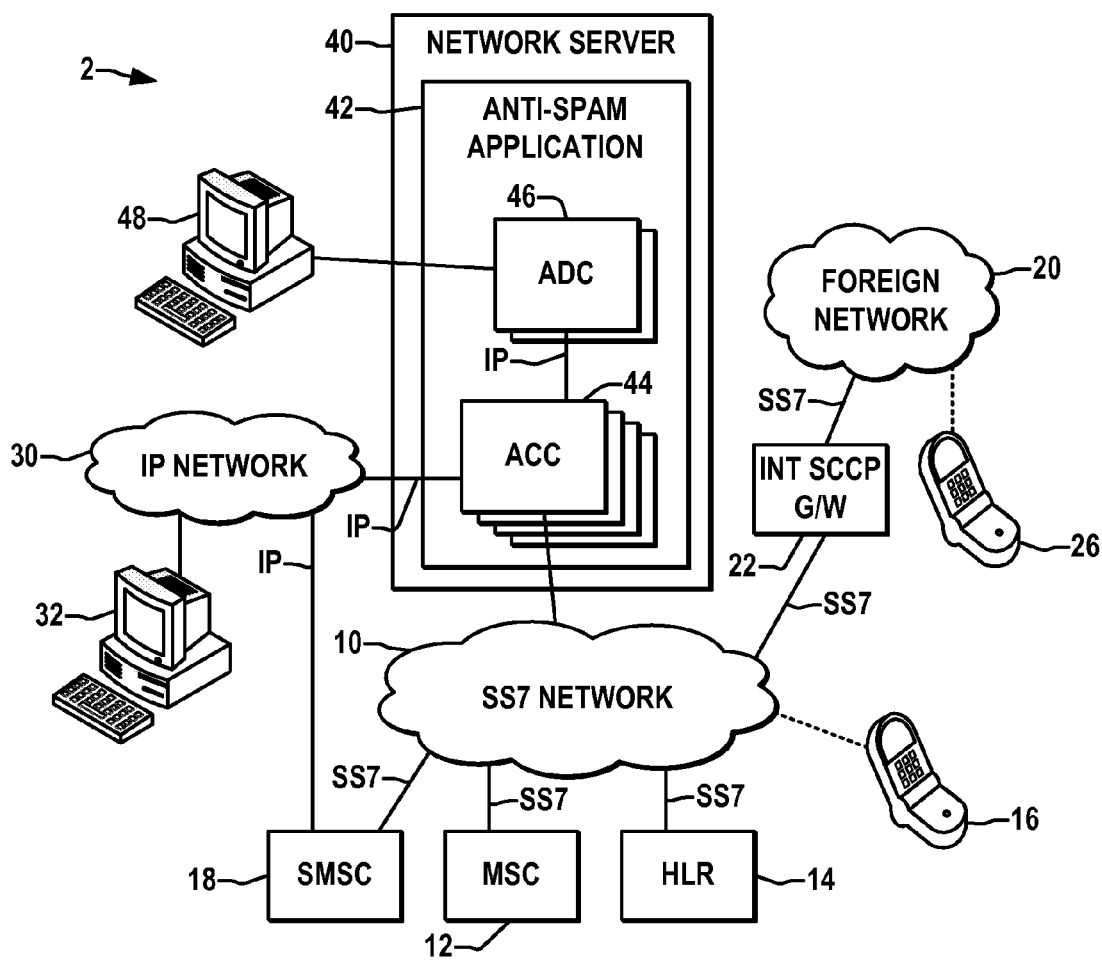
FIG. 1 is a high level schematic diagram illustrating an exemplary telecommunications system with a system for MAP SMS message spam filtering including a network server-based anti-spam application in accordance with one or more aspects of the present invention.

Referring now to the figures, wherein the showings are for purposes of illustrating the exemplary embodiments only and not for purposes of limiting the claimed subject matter, FIG. 1 provides a view of a communications system 2 into which the presently described embodiments may be incorporated or in which various aspects of the invention may be implemented. Several embodiments or implementations of the various aspects of the present invention are hereinafter illustrated and described in conjunction with the drawings, wherein like reference numerals are used to refer to like elements throughout and wherein the figures are not necessarily drawn to scale.

As shown in FIG. 1, the exemplary telecommunications system 2 includes various operationally interconnected networks of various topologies, including an SS7 network 10 in which various MAP messages may be exchanged and operated on, and wherein various network elements may be operatively coupled to provide mobile telecommunications in a known manner. An SS7 network as used herein refers to any network in which MAP messages are exchanged, transferred, or otherwise processed or employed, and MAP messages are any messages supported by any version of the MAP protocol. In the simplified illustration of FIG. 1, a single mobile switching center (MSC) 12 and an associated home location register (HLR) 14 and a short message service center (SMSC) 18 are depicted, wherein it will be appreciated that the system 2 may include any number of MSCs 12, HLRs 14, SMSCs 18, visitor location registers VLRs, along with base station systems, base station controllers, etc., and other network elements (not shown) for implementing mobile telecommunications functionality. The SS7 network 10 is also operatively coupled to one or more foreign networks 20 via an INT SCCP gateway 22 providing message exchange between the SS7 network 10 and the foreign network 20 whereby mobile communications can be achieved between a mobile phone or device 16 located in the network 10 and another mobile communications device 26 in the foreign network 20. In this example, the messaging used in the SS7 network 10 is in accordance with the Mobile Application Part (MAP) protocol, and the exemplary foreign network 20 is similarly an SS7 network using MAP protocol messaging, although not a strict requirement of the present invention and the SS7 networks employing the various aspects of the present invention may be coupled with any type of foreign network using any suitable messaging protocol(s).

The SS7 network 10 in the embodiment of FIG. 1 is further operatively coupled with an Internet Protocol (IP) network or other packet-based network 30 for providing communications with one or more IP-based devices, such as a computer 32, wherein the IP-based system 30 may include suitable IP gateway elements (not shown) coupling the packet-switched IP network 30 with the SS7 network 10 to provide call and other services including short messaging (SMS) services between IP-based devices 32 and the exemplary mobile device 16 and other devices associated with the network 10. The various exemplary networks 10, 20, and 30 thus provide communicative connection of various communications devices and network elements allowing various telephones, mobile units, computers, digital assistants, etc. to communicate with one another for exchange or transfer of voice and/or video, short messages, and other data or information therebetween, wherein the telecommunications system 2 generally can include any number of wireless, wireline, and/or packet-switched networks, wherein only a few exemplary elements are illustrated in FIG. 1 for purposes of description without obscuring the various SMS spam filtering features and aspects of the invention.

The illustrated system 2, moreover, includes one or more network servers 40 or other network elements, in or on which one or more anti-spam applications (ASA) 42 are run or executed, wherein the application 42 can be resident on one network element 40 or can be distributed across multiple network elements operatively coupled with the SS7 network 10. Moreover, the application 42 can be any suitable combination of hardware, software, logic, etc., whether unitary or distributed, whereby the various spam filtering aspects of the invention can be easily scaled according to network traffic conditions on a dynamic basis. The application 42 in the illustrated embodiment can be accessed for programming via a computer or other device 48 operatively coupled with the server element 40 or with the network 10 for adaptation, programming, updating, etc. by a user and/or a service provider for configuring one or more parameters associated with the spam filtering features described herein. In one exemplary embodiment, the application 42 includes two primary anti-spam components 44 and 46, in this case identified as an anti-spam control component (ACC) 44 and an anti-spam data component (ADC) 46, either or both of which may be distributed or replicated or instantiated multiple times.

The network server element 40 and the ASA 42 constitute a system for filtering spam SMS messages in the SS7 network 10, wherein the server element 40 is operatively coupled with the SS7 network 10 to receive MAP short message service (SMS) messages as well as other MAP messages from the network 10 for SMS spam filtering via the ASA 42 prior to delivery of the SMS messages to a short message service center (SMSC 18), MSC 12, or other switching element of the SS7 network 10. In a preferred operating condition, the server 40 is provided with all MAP messages in the network 10 and will determine initially whether each message is an SMS message, and if not, forward the message to the desired destination. For SMS messages, the application 42 will determine whether the MAP SMS message is spam, and if so, refrain from forwarding such to the SMSC 18, thereby reducing the amount of spam-related traffic in the network 10 and shielding users from receipt of such SMS spam. MAP SMS messages that are scrutinized and found to be non-spam (good) are forwarded by the ASA 42 to the desired destination using normal SMS processing, for example, via the SMSC 18, MSC 12, or other network element(s). Thus, the ASA 42 receives the MAP SMS messages and classifies these as either spam or good, and thereafter selectively provides good MAP SMS messages to the SMSC 18 for delivery to the corresponding destinations, and refrains from providing spam MAP SMS messages to the SMSC. In the exemplary embodiment, moreover, messages which are considered spam (based on the application of the anti-spam filtering in the ASA 42), are blocked and may be discarded or persisted (stored) for further operator intervention via the computer 48 or other means.

The network 10, the server 40, and the ASA 42 are configured to process and operate on any form of MAP SMS messages, including mobile originated (MO) SMS messages and mobile terminated (MT) SMS messages, for example, Intra network GSM MAP SMS Messages, ANSI MAP messages, etc. GSM MAP messages from the foreign network 20, for instance, may be received in the network 10 via the international SCCP gateway 22, which performs routing of the SS7 messages to the intended destinations based on the Signaling Connection and Control Part (SCCP) protocol information available in the messages, wherein the network 10 is modified accordingly to provide SMS messages to the ASA 42 prior to selective delivery thereby to the destinations based on the results of the SMS spam filtering. In the preferred implementation, the SMS related MAP messages are a part of the total MAP messages in the network 10, wherein the ASA 42 may be configured to process only the SMS related messages. However, in order to further minimize the spam-related network traffic without modification of the SCCP gateway 22 to selectively route only the SMS related MAP messages to the ASA 42, the preferred implementation of the ASA 42 allows the filtering by the ASA 42 of all MAP messages in the network 10, where the ASA 42 filters the SMS related messages for spam check from the incoming SS7 MAP traffic from the foreign network 20. This approach limits the impact to existing network infrastructure in the customer network 10, which can be configured to forward all SS7 MAP messages to the ASA 42. The ASA 42, in turn, initially identifies or classifies the non-SMS SS7 MAP messages and delivers these to their intended destinations. For SMS MAP messages, the ASA 42 performs spam checking or filtering. In one possible implementation, the ASA 42 provides spam filtering for MAP mobile originated and mobile terminated messages including but not limited to: SendRoutingInfo-forSM messages (referred to herein variously as MAP_SRI_SMS, SRI_SMS, SRI_SMS_ACK) for MAP versions 1, 2, and 3; forwardSM-MO messages (herein MAP_FW_SMS_MO, FW_SMS_MO); forwardSM-MT for MAP version 3 (herein MAP_FW_SMS_MT, FW_SMS_MT); forwardSM in MAP version 1 and version 2 (herein MAP_FW_SMS, FW_SMS) for support of both mobile originated and mobile terminated SMS messages. Moreover, the MAP SMS messages may include concatenated messages including a plurality of SMS messages and which may be received in whole or partially in segments. The exemplary messages described herein are not an exhaustive list of the possible MAP SMS messages that can be supported and processed by the ASA 42, wherein additional messages be supported, such as for supporting other SMS related MAP messages in prior, current, and/or future MAP versions and/or for supporting spam filtering for non-SMS messages, for instance, to provide a general purpose spam filtering solution in the SS7 network 10.

Figure 2:
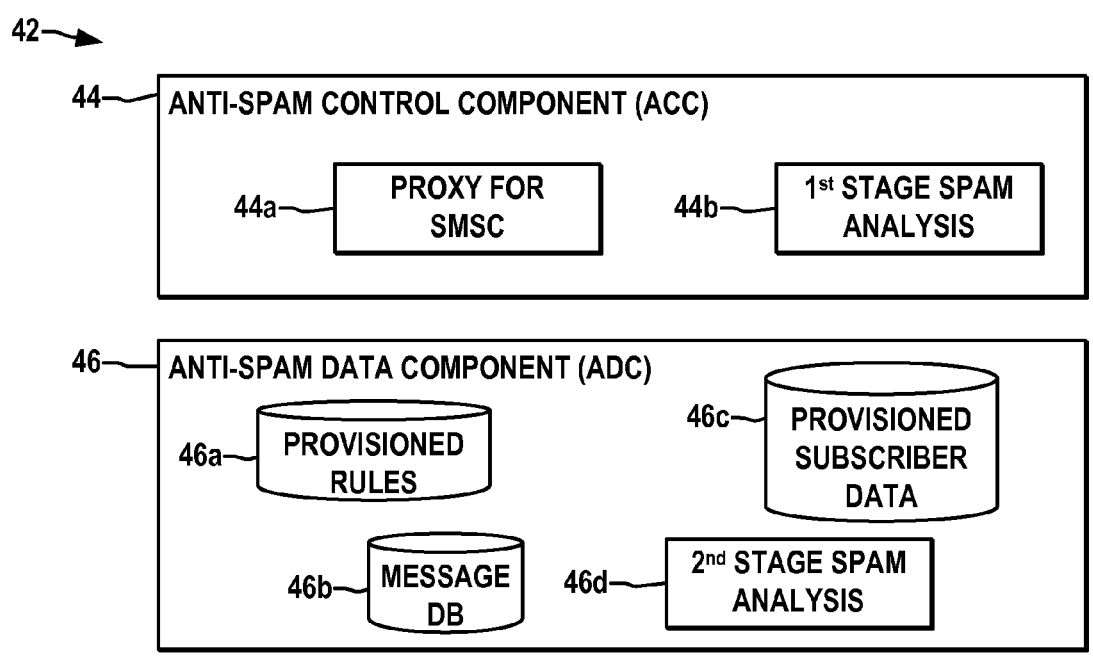
FIG. 2 is a schematic diagram illustrating further details of the exemplary anti-spam application in the system of FIG. 1.

Referring now to FIGS. 1 and 2, the anti-spam application 42 in one embodiment is implemented as multiple components on the network server 40, including a first anti-spam control component (ACC) 44 that performs first stage spam filtering via a first stage analysis component 44b to classify the MAP SMS messages as spam, suspected spam or good, and may also comprise a component 44a serving as a proxy for one or more network short message service centers (SMSC) 18. The exemplary ASA 42 also comprises a second anti-spam data component (ADC) 46 that performs second stage spam filtering on suspected spam messages to classify these as spam or good. In the illustrated example, the ADC 46 comprises a set of provisioned rules 46a and a message database 46b for buffering the MAP messages being filtered and for persisting identified spam or suspected spam messages, along with a data store for provisioned subscriber data 46c and a second stage spam analysis component 46d.

In one preferred implementation, the first stage spam analysis component 44b provides for spam filtering using a rules engine that processes user or service provider configurable rule sets 46a to identify the received MAP SMS messages as either spam, good, or suspect, and the second stage spam analysis component 46d performs Bayesian filtering to classify the suspected spam messages as spam or good. In operation for processing SMS messages in the network 10, moreover, the exemplary ASA 42 is preferably operative to selectively perform configurable acknowledgment processing, configurable alarm processing, and/or configurable pattern matching with respect to suspected spam in the second spam analysis stage via component 46d, wherein such operations may be configurable by a user or a service provider to tailor the SMS spam filtering service. For instance, a user or service provider may allow a user to define patterns of suspected text strings for filtering in the second stage component 46d, as well as allowing configuration of how suspected spam messages are acknowledged and configurable alarm behavior. Moreover, the second stage analysis component 46d may be further configurable by users or service providers in order to customize the handling of suspected spam with respect to other filtering decisional logic, such as whether to relay, block, discard, or persist suspected spam.

The ACC 44 provides network connectivity for SS7-MAP messages 600 in the network 10 and handles spam checking for SMS and relay or bridge functionality for non-SMS MAP messages. The ADC 46 provides storage and analysis of suspect spam SMS MAP messages, as well as operator interfaces, SMS forwarding capability (through the ACC 44), distribution of SPAM check rules/criteria/thresholds, and synchronization of dynamic data among the ACCs 44. These service application packages 44, 46 can be deployed in a variety of ways on one or more network servers or entities 40, including but not limited to single node implementations in which the ASA 42 is deployed on a single server 40 with the ACC 44 and ADC 46 deployed on the same node for low-end configurations, mated pair configurations in which the ASA 42 is deployed on a pair of network nodes or entities with ACCs 44 and ADCs 46 on both nodes and with the data persisted by the ADC 46 being replicated between the two nodes in the pair for providing a low-end configuration with high availability, and/or distributed configurations with the ASA 42 deployed in a distributed manner to provide high capacity and reliability, wherein the ADC 46 may be deployed on a mated pair of network nodes and the ACC 44 can be deployed on nodes in an N+K configuration in one example.

The illustrated ASA 42 can provide spam filtering for SMS messages from a GSM SS7 or other type of foreign network 22 or for MAP SMS messages originated within the home SS7 network 10. For message relay operation, the ASA forwards messages (other than persisted or discarded spam) to the target destination such that the destination can send the response directly to the original sender of the message, in which case the ASA 42 is not in the acknowledgment path. Alternatively, the ASA can operate in bridge mode, wherein the ASA 42 operates to forward a filtered message to the desired destination, and thereafter collects responses from destination and returns the response to the original sender of the message, in which case the ASA 42 is in the acknowledgment path. To filter potential spam from foreign networks 20, the ASA provides spam filtering for incoming SMS messages from the gateway 22. For controlling SMS spam originated within the network 10, ASA 42 supports additional messages for routing messages within the network 10. For inter-network messages in the exemplary system 2, the SCCP gateways 22 near the network boundaries operate to route all the SS7 MAP messages to the ASA 42 for both Inter-Carrier SMS Messaging (spam filtering for SMS messages originated by the foreign network 22 subscriber destined for a subscriber in the home network 10) as well as SMS from Roaming Subscribers (spam filtering for SMS messages that are originated by a home network subscriber roaming in the foreign network 20), in which case the foreign network 20 attempts to forward the SMS message to the home network SMSC 18 for termination. For Inter-carrier messaging, a foreign network subscriber (e.g., mobile 36 in FIG. 1) originates an SMS message for a home network subscriber (e.g., mobile 16 in FIG. 1), and the MSC (not shown) serving the foreign network subscriber forwards the FW_SMS_MO message to the SMSC in the foreign network. In order to terminate the message, the foreign network SMSC first sends an SRI_SMS (send routing information) message to the HLR 14 in the home network 10 to determine the routing info for the FW_SMS_MT message that carries the actual SMS message. Once the foreign SMSC gets the routing info for the home subscriber 16, it would send the FW_SMS_MT message to the MSC (e.g., MSC 12) serving the home subscriber. For cases where the home subscriber 16 is in the home network 10 (as shown in FIG. 1), the ASA 42 inhibits delivery of SMS spam to the subscriber 16 and reduces the amount of network message traffic associated with the spam.

For SMS from roaming subscribers, the home subscriber roaming in a foreign network 20 originates a message for another party, wherein the terminating party can be a subscriber of the home network 10 or of a foreign network. Since the originating subscriber does not belong to the foreign network, the serving foreign network MSC forwards the FW_SMS_MO message to the SMSC 18 in the home network 10, wherein the ASA 42 pre-filters such MAP SMS messages prior to delivery of non-spam messages to the SMSC 18 for termination. The SCCP gateway 22 is thus configured to forward all the SS7 MAP traffic from foreign networks 20 to the ASA 42 for filtering of SRI_SMS, FW_SMS_MO, FW_SMS_MT, and other MAP SMS messages using the MAP level information in the message that indicates the message type, with non-SMS messages being delivered by the ASA 42 to the desired destination using the relay or bridge capability. For relay operation, the ASA 42 forwards the message to the Called Party Address in the original message such that the called party can send the response directly to the sender of the original message, wherein the ASA 42 is not in the acknowledgment path of the original message. In bridge mode, the ASA 42 acts like a bridge between the sender and the called party, and accordingly prepares and invokes the message, corresponding to the original message, on the called party, and receives the response from the called party. Then ASA 42 prepares and sends the response to the original sender as if the response was coming from the called party.

Intra-network mobile originated messages are sent by the service MSCNLR 12 to the SMSC 18 as FW_SMS_MO messages for termination using SRI_SMS and FW_SMS_MT messages. Mobile originated messages (e.g., FW_SMS_MO) from a home subscriber 16 in the SS7 network 10, could be sent to either another home network subscriber or a foreign network subscriber, wherein the message is first sent by the serving MSCNLR 12 with the ASA 42 first performing spam filtering of these FW_SMS_MO messages before they are sent to the SMSC 18.

The entities of the network 10 are suitably configured so as to provide the necessary routing of the MAP messages to the ASA 42 for spam filtering as described herein, for instance, with network STPs being configured such that messages directed to the SMSC 18 are routed to the ASA 42. Moreover, when the ASA 42 is configured for bridge mode operation, only the SMS related messages (SRI_SMS, FW_SMS_MO, FW_SMS_MT, and FW_SMS) need to be sent to the ASA 42, and if found to be good by the ASA 42, these are delivered to their destination using the bridge functionality. The incoming message to the ASA 42 can be global title routed or point code routed. The ASA 42 can then use the same mechanism to send the message to the SMSC 18. When the ASA 42 is instead configured for relay operation, the ASA 42 also filters FW_SMS_MO messages and mobile originated FW_SMS messages for spam check, and relays the rest of the MAP messages to the SMSC 18. Similarly, FW_SMS_MO messages and mobile originated FW_SMS messages that are found good after filtering are also relayed to the SMSC 18. Where routing changes on the network STPs are made in order to route messages directed to the SMSC 18 to the ASA 42, the ASA 42 operates to relay the filtered messages with appropriate modified information so that they can eventually be sent to the SMSC 18 instead of being looped back to the ASA 42. The exemplary ASA 42 supports version 1 and version 2 and other MAP protocol version messages at the protocol level to identify when a specific FW_SMS message is mobile originated versus mobile terminated so that appropriate filtering rules can be evaluated. The filtering rules and other handling configured for FW_SMS_MO message are applied in the ASA 42 when a FW_SMS message carries mobile originated message. Similarly, filtering rules and other behavior configured for FW_SMS_MT messages are employed when a FW_SMS_MT messages carries mobile terminated message.

The ASA 42 performs spam filtering in two stages, where the first is referred to as 'Spam Check', and the second is referred to as 'Spam Analysis'. In the first stage, an SMS related message is checked for potential spam conditions based on spam checks configured in the ASA 42 for which the analysis can be performed completely based on information in the message and certain data configured in the application. Based on these spam checks via components 44b and 46d (FIG. 2), a MAP SMS message can be marked as suspect, spam or good. If a message is determine to be good, the ASA 42 forwards the message to the desired destination (called party address in the incoming message). If a message is identified as spam in the first stage, e.g. from a forbidden network or other configured first stage spam filtering condition, the ASA 42 persists the message as spam and need not perform second stage analysis of the message content. For such messages, moreover, a configurable set of actions are taken by the ASA 42. If a message is found to be suspected spam in the first analysis stage, e.g., a volume threshold has been exceeded for the source network, the second spam analysis is performed to determine if the message is really spam. For such suspected messages, a configurable set of actions would be taken by the application 42.

The exemplary ASA 42 uses a rules engine to execute the first stage spam check rules for each SS7 MAP SMS message in which a configurable rule set 46a is executed, and wherein a rule set can be created to execute a number of rules for a message. The logic for the execution of different rules is specified in the rule set. Each individual rule in a rule set can be either written in the rule set itself or can involve a functional call to the implementation in the application 42. If a rule can be written completely using the data passed during rule set execution then it is specified in the rule set itself. But if a rule evaluation requires data provisioned in the ASA 42 or some dynamic data maintained by the application 42, then the rule would be implemented using a function call implemented in the ASA 42. The rules engine of the ASA 42 provides the ability to implement logic for the implementation of a rule set for each message, thereby enabling configurability of the rule set for each message. The ASA 42 provides a default rule set for each message, with the ability to create further rule sets based on a particular customer requirement without necessitating ASA modification.

The second stage spam analysis operates on suspected spam MAP SMS messages which have been persisted, such as FW_SMS_MO, FW_SMS_MT and SMPP_SUBMIT_SM MAP messages. The ASA 42, moreover, can provide a configurable response to a SUSPECT SRI_SMS message without second stage filtering, with SUSPECT SMS messages (FW_SMS_MO, FW_SMS_MT, or SMPP_SUBMIT_SM) being persisted for further analysis. The ASA 42 preferably maintains a repository of the known spam messages, which were previously received and identified as spam, wherein content of a new suspect SMS message is analyzed against the contents of the known spam SMS messages to determine if the suspect message is spam. If the new message is thus identified as spam, it is persisted in the pool of known spam messages. However, if the new message is determined to be good in the second stage, the message is forwarded to the SMSC 18.

The ASA 42 may employ a model for different classes of spam messages and their characteristics that can be derived by periodic analysis of the contents of known spam messages. This periodic analysis process is also referred to as 'training' of the model. This periodic training also helps determine outlier patterns that are likely to appear in a spam message. These patterns are used in configurable pattern matching filters in the spam filtering to detect a suspected spam message to help reduce the likelihood of blocking good messages during the first stage, e.g., if certain network based threshold has been violated by a source network, the use of the pattern matching can help avoid blocking good messages from that network. Any new suspect SMS message can be compared in the ASA 42 against the model to determine if it belongs to any of the classes of the spam messages. If so, the suspect message is classified as spam and persisted among it's category, and if not, the message is forwarded to the SMSC 18. Any cleared MAP SMS messages are forwarded to SMSC 18, wherein the ASA 42 can employ multiple SMSCs for this purpose. A customer may chose to identify one or more dedicated SMSCs to support termination of cleared messages from the ASA 42 because the selected SMSC must support the message received and sent to the address embedded in the message. Furthermore, the FW_SMS_MO messages may contain the target SMSC address, wherein the ASA 42 can also support forwarding of the FW_SMS_MO messages to the SMSC address present in the message.

The ASA 42 also supports configurable data that can be used to implement configurable spam filtering for MAP SMS messages, and may maintain dynamic data based on the network traffic that are used during spam filtering, wherein the rules engine may use such dynamic data. Exemplary configuration data for the ASA 42 may comprise thresholds for network traffic, allowed/forbidden networks, and certain other global data required for spam filtering. Such data may generally be categorized in one of several exemplary categories, including network based thresholds for messages (e.g., thresholds for different network groups for the volume of individual messages received from each network belonging to the group, on a periodic basis, such as hourly, daily etc, as well as a threshold for a message across network in any given interval, e.g., hourly, daily etc.). Another category of configuration data is per-sender thresholds for messages, such as thresholds configured for messages coming from specific sources or a group of senders. Yet another category includes Forbidden/Allowed/Trusted Networks, wherein such data is configured to identify specific networks that are allowed, barred, or trusted for sending SMS messages. As one possible default, if a specific network is not configured in this data category, messages are allowed from that network, wherein messages from such a source would still be subjected to the other types of spam filtering (e.g., volume based checks, etc.). For a network is configured as trusted, the ASA may forego further spam filtering for any message coming from these trusted networks and thus are classified as good. If a network is barred, the message from that network is marked as spam. The category configuration data may be manually configurable by an operator, and/or the ASA 42 may be operative to automatically manage the state of a network based on certain criteria.

Another category of configurable data includes adjacency thresholds used to configure the threshold for volume of messages allowed for a specific area of the home SS7 network 10. This facilitates detection in the ASA 42 of message bursts that can be generated when mass SMS messaging is in progress, wherein operators may configure time intervals for taking measurement related to this spamming technique. The ASA 42 can also enable/disable pattern matching checks on a per network basis, and can allow an operator to manually enable/disable pattern matching checks for a given network, thereby facilitating a balance between activating pattern matching when required versus foregoing expensive pattern matching checks. The ASA 42, for example, may dynamically activate/deactivate pattern matching checks based on detection of SUSPECT or spam messages. Thus, if there are no suspect or spam message during a specific period, the ASA 42 can automatically de-activate the pattern matching checks for specific networks. Similarly, when the ASA 42 determines that spamming is perhaps in progress, by detecting suspect/spam messages during a specific period, the ASA 42 can activate the pattern matching checks to filter out spam from good. As an example, when volume based thresholds are exceeded from a network, activation of the pattern matching checks would help determine which ones are spam and which ones are good so that good messages from that network are not unnecessarily blocked as spam.

The configuration data may also include user or operator configurable patterns for the pattern matching checks. In this case, the ASA 42 maintains a configurable set of patterns to be used in the pattern matching filters during the spam filtering, wherein the pattern list may be initially determined and/or updated based on the training of the spam analysis rules engine in the application 42. These automatically generated patterns are the tokens in the training data set that are most likely to occur in spam messages. An operator or user, moreover, can also configure additional patterns beyond those automatically determined by the application, and the automatically generated patterns are preferably updated every time the training is executed for the spam analysis rules engine. The configurable data may also include a spam filtering rule-set associated with a message, whereby a rule-set can be specified for execution for each message in the first filtering stage in order to check whether the message is suspect spam. In addition, the ASA 42 allows configuration of actions taken for suspected spam and spam SMS messages, which may be defined on a per message type basis, PLMN, and/or a suspect/spam reason basis. In one possible implementation, the ASA 42 allows configuration of actions such as: override the suspect decision and relay message to it's destination; generate an alarm; analyze the content of the message using the second stage analysis for SMS messages that carry text, i.e., FW_SMS_MO, FW_SMS_MT, and SMPP_SUBMIT_SM and that are definitively classified as spam during the first stage itself; enable pattern matching filter for any subsequent incoming messages that carry text (e.g., FW_SMS_MO and FW_SMS_MT); return a success response to the client, with configurable return information; close the connection with a configurable error response; and close the connection without an acknowledgment, although other actions are possible beyond these specific examples.

Another type of configuration data includes network related configuration data, wherein the ASA 42 allows configuration of data such as ASA's Global Title Address, home network address prefix, forwarding SMSC addresses, etc. The ASA 42 also supports configuration data for message request/response, which may be used when sending a response to a message or when invoking a message (e.g., as part of relay or bridge capability) on a network element. This helps ensure that the network related information in the response/request message is as required for a customer network so as to correctly route the message to the intended destination. Such data could include message response data including configurable values for parameters in an outgoing response, e.g., calling party address information, status of the request, any cause indication, etc., which can be defined for each message type for which the ASA 42 can be required to send a response back to the calling party, as well as message forwarded to nodes data for supporting relay or bridge capability.

The ASA 42 can also maintain dynamic traffic data to evaluate spam check rules for the SMS messages, including counters that are operable during a specific interval, e.g., hourly, daily, monthly etc. Examples include per network group (PLMN) counters indicating the number of messages received from a specific network group within a specific period, which can be maintained separately for each message type; per message type counters to provide counts for a specific message type across all the networks during a specific period; adjacency counters that provide totals for messages received for a specific network prefix, e.g., numbers of messages sent to subscribers in a specific area to indicate whether mass spamming is in progress targeting a specific area; and per-sender type counters providing the number of messages received from a specific sender within a specific period. The counters, moreover, can be synchronized for multiple spam-check nodes by the ASA 42.

Figure 3:
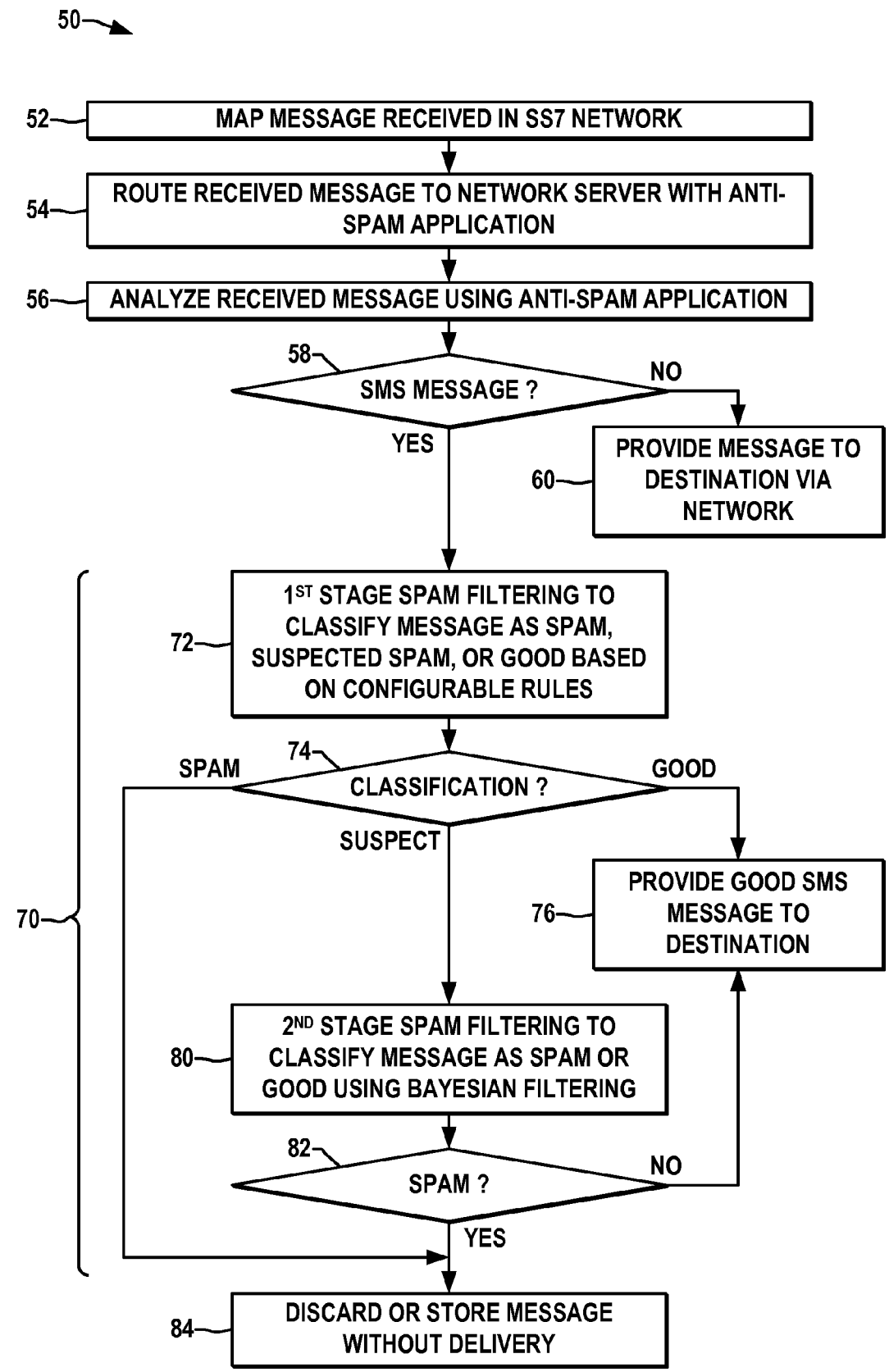
FIG. 3 is a flow diagram illustrating an exemplary method of filtering spam SMS messages in an SS7 network according to further aspects of the invention.

Referring now to FIG. 3, an exemplary method 50 is illustrated for filtering spam SMS messages in an SS7 network, such as the exemplary network 10 above or other SS7 networks in which MAP messaging is used. Although the exemplary method 50 is illustrated and described hereinafter in the form of a series of acts or events, it will be appreciated that the various methods of the invention are not limited by the illustrated ordering of such acts or events except as specifically set forth herein. In this regard, except as specifically provided hereinafter, some acts or events may occur in different order and/or concurrently with other acts or events apart from those acts and ordering illustrated and described herein, and not all illustrated steps may be required to implement a process or method in accordance with the present invention. The illustrated method 50 and other methods of the invention may be implemented in hardware, software, or combinations thereof, in order to provide MAP SMS message filtering services in an SS7 network, wherein these methods can be practiced in hardware and/or software of the above described ASA 42 or other forms of logic, hardware, or software in any single or multiple entities operatively associated with an SS7 network, wherein the invention is not limited to the specific applications and implementations illustrated and described herein.

Beginning at 52, a MAP message is received in an SS7 network, wherein exemplary MAP messages 600, 610, 620 are illustrated and described below with respect to FIGS. 8A-8C. The method 50 can process mobile originated (MO) and/or mobile terminated (MT) MAP SMS messages, whether unitary, concatenated, segmented, etc. The received MAP message is routed or otherwise provided at 54 to an anti-spam application (e.g., ASA 42) running on a network element (e.g., on or in network server 40). The received message is analyzed at 56 and a determination is made at 58 as to whether the MAP message is a short message service (SMS) message. If not (NO at 58), the non-SMS messages are forwarded at 60 by the ASA 42 to the intended destination via the SS7 network using regular message processing. For SMS-related MAP messages (YES at 58), the method 50 proceeds to 70 for classifying the MAP SMS messages as suspected spam, spam, or good. In one embodiment, a two-stage filtering process is employed at 70, including performing first stage spam filtering at 72 to classify the MAP SMS messages as suspected spam, spam, or good at 74. In one possible implementation, the first stage spam filtering at 72 includes buffering or storing the MAP SMS messages in a message database associated with the anti-spam application (e.g., data store 46b in FIG. 2 above), and evaluating a set of rules (46a) to classify the MAP SMS message as suspected spam or good.

If the MAP SMS message is determined to be good after the first stage analysis (GOOD at 74), the message is directed at 76 to the intended destination in the form of a short message. If the SMS message is determined in the first stage filtering to be spam (SPAM at 74), the process 50 proceeds to discard or store (persist) the spam message at 84 without delivery to the intended destination. Otherwise (SUSPECT at 74), second stage spam filtering is performed at 80 on the suspected spam messages to classify the messages as spam or good. In one embodiment, the second stage spam filtering at 80 comprises performing Bayesian filtering to classify the suspected spam messages as spam or good. In the illustrated example, for MAP SMS messages comprising data and text, the exemplary first stage spam filtering is performed at 72 on both the data and the text, and the second stage spam filtering at 80 is performed on the text. In this embodiment, moreover, the second stage spam filtering at 80 may include selectively performing one or more of configurable acknowledgment processing, configurable alarm processing, and configurable pattern matching. Following the second stage analysis at 80, a determination is made at 82 as to whether the message is deemed to be spam or good. If the message is believed to be spam free (NO at 80), the method 50 proceeds to 76 and the good message is provided to the destination. If, however, the filtered MAP SMS message is identified or classified as spam (YES at 82), the message is not delivered, but instead is discarded or stored (persisted) at 84. In this manner, identified spam SMS is prevented from propagating further through the SS7 network 10, thereby alleviating customer dissatisfaction and minimizing undesirable SMS spam-related traffic in the network 10.

Figure 4A:
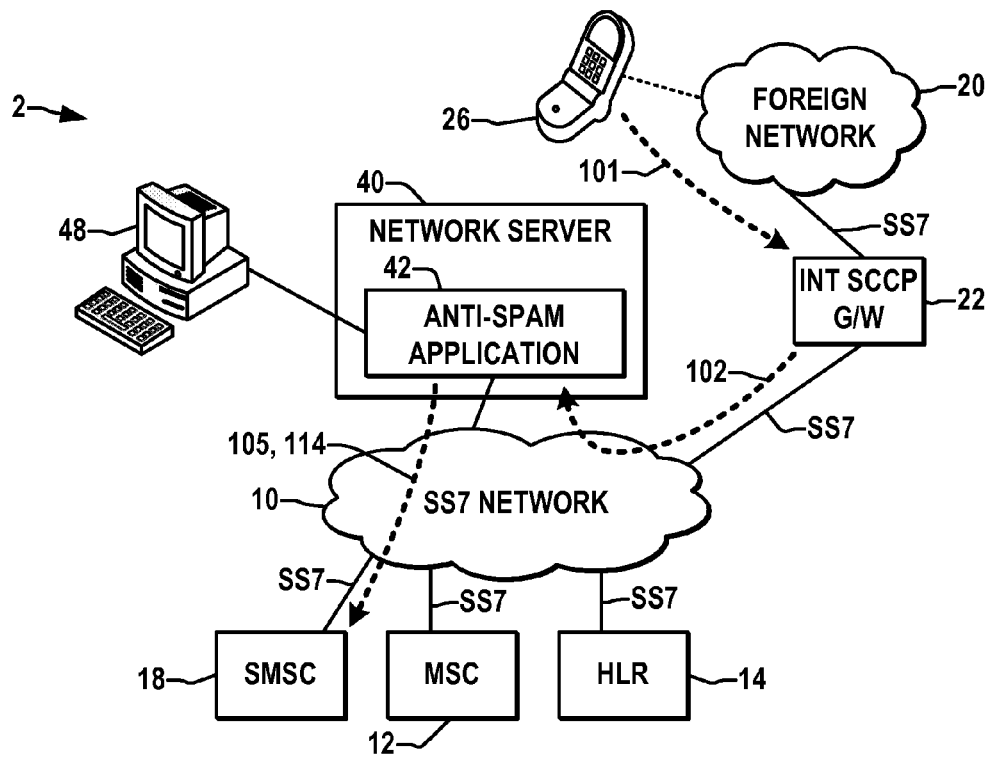
FIG. 4A is a simplified schematic diagram illustrating the system of FIG. 1 in the processing of mobile originated MAP SMS messages originating in a foreign network using the exemplary MAP SMS spam filtering systems and methods.
Figure 5:
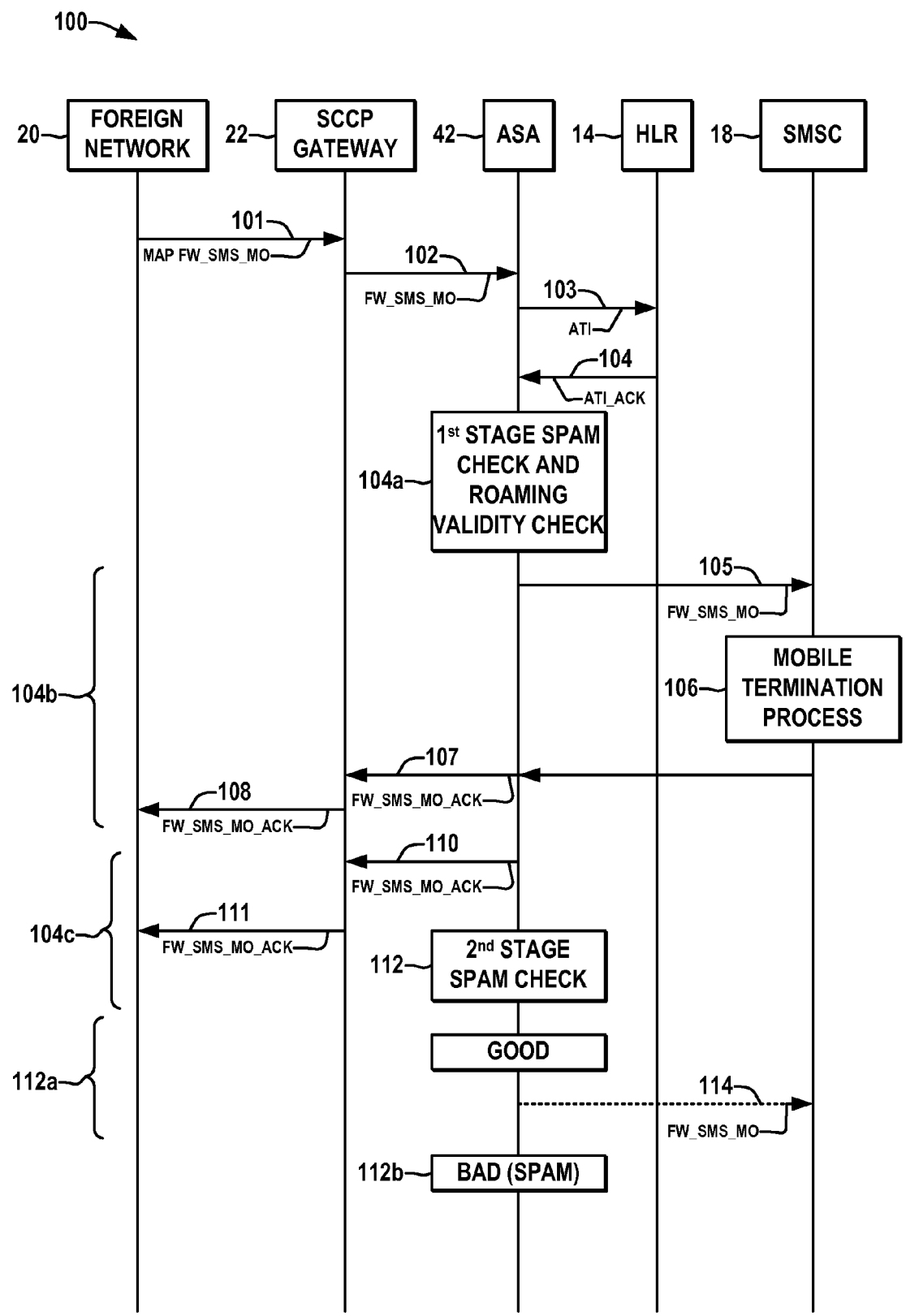
FIG. 5 depicts a message flow diagram illustrating processing of the exemplary mobile originated MAP SMS messages in the system of FIGS. 1 and 4A.

Referring now to FIGS. 4A and 5, FIG. 4A shows the communications system 2 of FIG. 1 in the processing of mobile originated MAP SMS messages 101, 102, 105, and 114 originating in the foreign network 20 using the exemplary MAP SMS spam filtering systems and methods described above, and FIG. 5 illustrates an exemplary message flow diagram 100 showing the message details of the message processing logic for mobile originated SS7 MAP messages with respect to the scenarios of the SMS messages in the SS7 network 10 of the system of FIGS. 1 and 4A. In conventional SMS processing, mobile originated SMS messages are submitted to an SMSC (e.g., SMSC 18) for processing, wherein such MO SMS messages can be originated by a mobile unit located in the home network 10 (e.g., by mobile 16 in FIG. 1) or by a mobile 26 located in the foreign network 20 when the subscriber is roaming, as shown in FIG. 4A. In either scenario, the MO SMS message is processed by an SMSC in the subscriber's home network which initiates termination procedure for the message, wherein the process of identifying the particular SMSC to process the MO SMS message depends on the network technology (e.g., GSM/UMTS or ANSI). While FIG. 5 illustrates the situation in which the mobile originated MAP SMS message coming from the foreign network 20, the same or similar processing applies to mobile originated MAP SMS messages originating from within the SS7 home network 10. The ASA 42 provides for pre-filtering such SS7 MAP SMS messages before they are sent to an SMSC for termination, wherein the ASA 42 can be deployed to receive all the incoming SS7 network messages (SMS and non-SMS) to filter MAP SMS messages for spam filter processing, with non-SMS messages being relayed to their destination, whether through relay or bridge operation. Similarly, good MO SMS messages are relayed to their destination via the SMSC 18 while the spam MO SMS messages are not delivered to the SMSC 18.

As shown in FIG. 5, a MAP_FW_SMS_MO message is received at 101 at the SCCP gateway 22 from the foreign network 20, and the gateway 22 transfers the message at 102 to the ASA 42. At 103, the ASA 42 queries the HLR 14, which then acknowledges at 104, and the ASA 42 verifies roaming validity and performs the first stage spam filtering at 104a. If the first checking verifies the roaming validity and that the message is good at 104a, the processing continues at 104b, with the FW_SMS_MO message being sent to the SMSC 18 at 105 for mobile termination processing at 106, followed by acknowledgment with a FW_SMS_MO_ACK being sent to the gateway 22 at 107 and from there to the foreign network 20 at 108. If the initial spam filtering indicates the message is spam at 104a, the processing continues at 104c with the ASA 42 sending a FW_SMS_MO_ACK to the gateway 22 at 110, which in turn sends a FW_SMS_MO_ACK 111 to the foreign network 20. If the message is determined to be suspect by the first stage processing at 104a, the second stage filtering proceeds at 112. If subsequently found to be good (112a), the ASA 42 sends a FW_SMS_MO to the SMSC 18 for termination as described above. If, however, the second stage yields a classification of spam at 112a, the message is persisted or discarded at 112b, with the ASA 42 taking any action(s) configured for the identified spam.

Figure 4B:
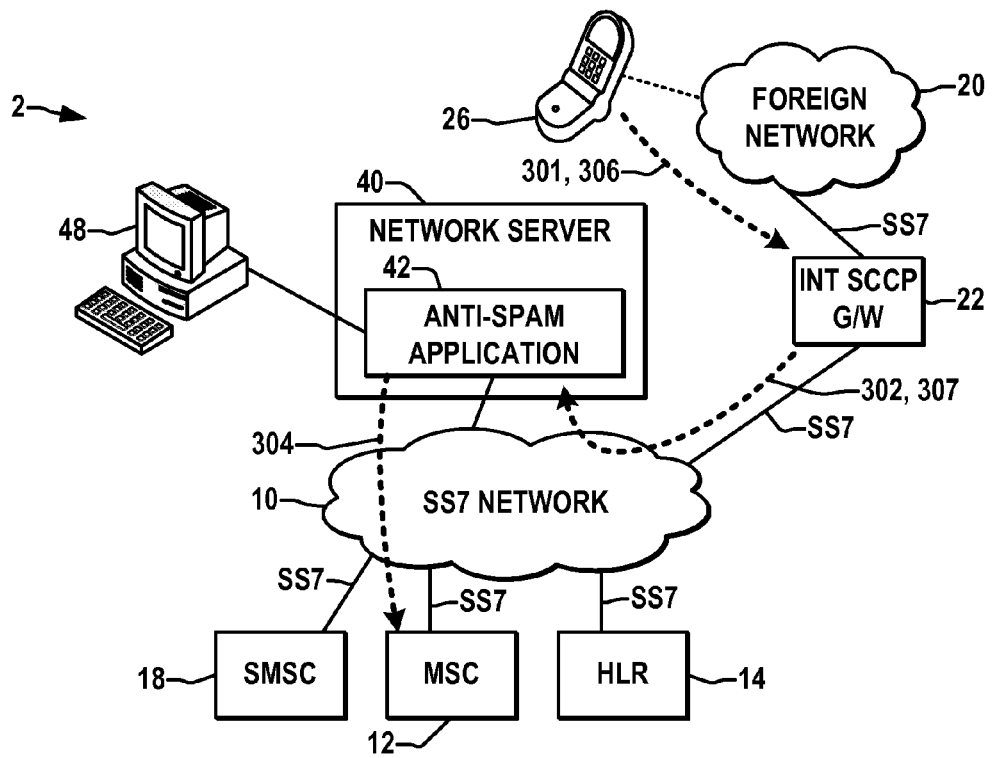
FIG. 4B is a simplified schematic diagram illustrating the system of FIG. 1 in the processing of mobile terminated MAP SMS messages originating in the foreign network using the exemplary MAP SMS spam filtering systems and methods.
Figure 6A:
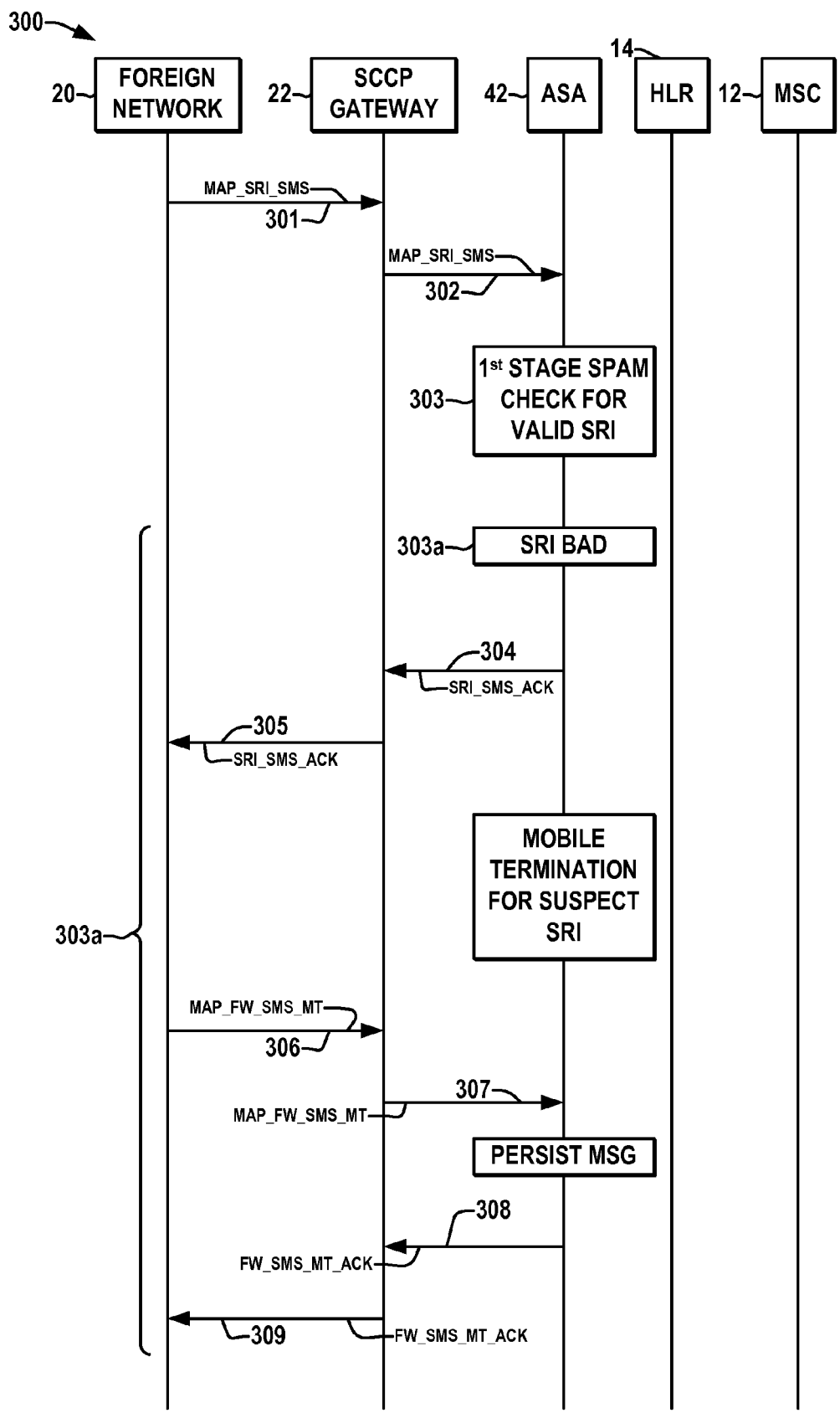
FIGS. 6A and 6B depict a message flow diagram illustrating processing of the exemplary mobile terminated MAP SMS messages in the system of FIGS. 1 and 4B.
Figure 6B:
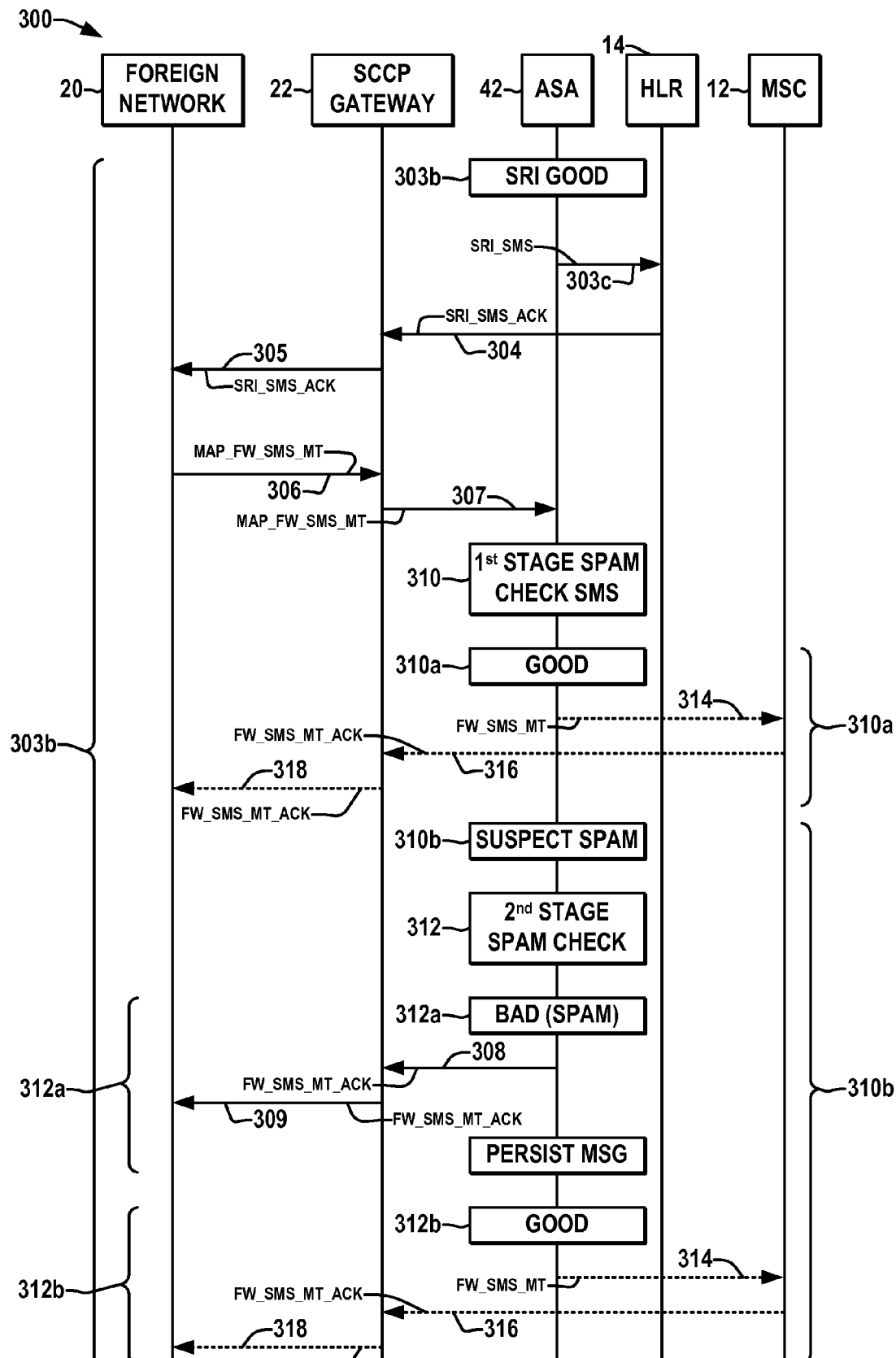

Exemplary message processing is illustrated in FIGS. 4B, 6A, and 6B, wherein mobile terminated (MT) MAP SMS messages 301, 306, 302, 307 are sent to the ASA 42 via the gateway 22 from mobile 26 in foreign network 20 and spam-free SMS messages 304 are provided from the ASA 42 to the MSC 12. In the message flow diagram 300 of FIG. 6A, a MAP_SRI_SMS message is received by the gateway 22 at 301 from the foreign network 20, and is provided to the ASA 42 at 302. The first stage spam filtering and SRI validity checking is performed at 303, and if the SRI is deemed invalid at 303a, the ASA 42 sends a SRI_SMS_ACK to the foreign network 20 via the gateway 22 at 304, 305, followed by mobile termination processing for a suspect SRI in the ASA 42. When the associated MAP_FW_SMS_MT arrives at 306, 307 in the ASA 42 from the gateway 22, the ASA 42 persists the message (e.g., or discards it according to the configurable actions for spam), and the ASA 42 returns a FW_SMS_MT_ACK at 308, 309 to the foreign network 20 through the gateway 22.

Referring also to FIG. 6B, the message flow 300 is illustrated for cases in which the SRI is identified as good at 303b. In this case, the ASA 42 sends an SRI_SMS request 303c to the HLR 14 to provide the routing information for the destination subscriber, and the HLR 14 responds at 304 by sending an SRI_SMS_ACK to the gateway 22 for forwarding at 305 to the foreign network 20. Subsequently, the foreign network provides the associated MAP_FW_SMS_MT at 306, 307 to the ASA 42 via the gateway 22, and the ASA 42 performs the configured first stage spam filtering checks on the MAP SMS message at 310. If the message is found to be good at 310, the process continues as indicated at 310a with the ASA 42 providing a FW_SMS_MT at 314 to the appropriate MSC 12 for termination, which then returns a FW_SMS_MT_ACK at 316 to the gateway 22, and the gateway 22 provides the FW_SMS_MT_ACK to the foreign network at 318. However, if the SMS MAP message is suspected spam at 310b, the ASA 42 performs the second stage analysis at 312. If the second stage yields a spam indication (312a), the ASA 42 sends a FW_SMS_MT_ACK to the foreign network 20 at 308, 309 via the SCCP gateway 22 and persists (e.g., or discards) the spam SMS MAP message. If, on the other hand, the second stage filtering classifies the message as good (312b), the ASA sends the MSC 12 a FW_SMS_MT at 314 for termination, with the MSC 12 then returning a FW_SMS_MT_ACK to the gateway 22 at 316, which then passes the FW_SMS_MT_ACK at 318 to the foreign network.

Figure 7:
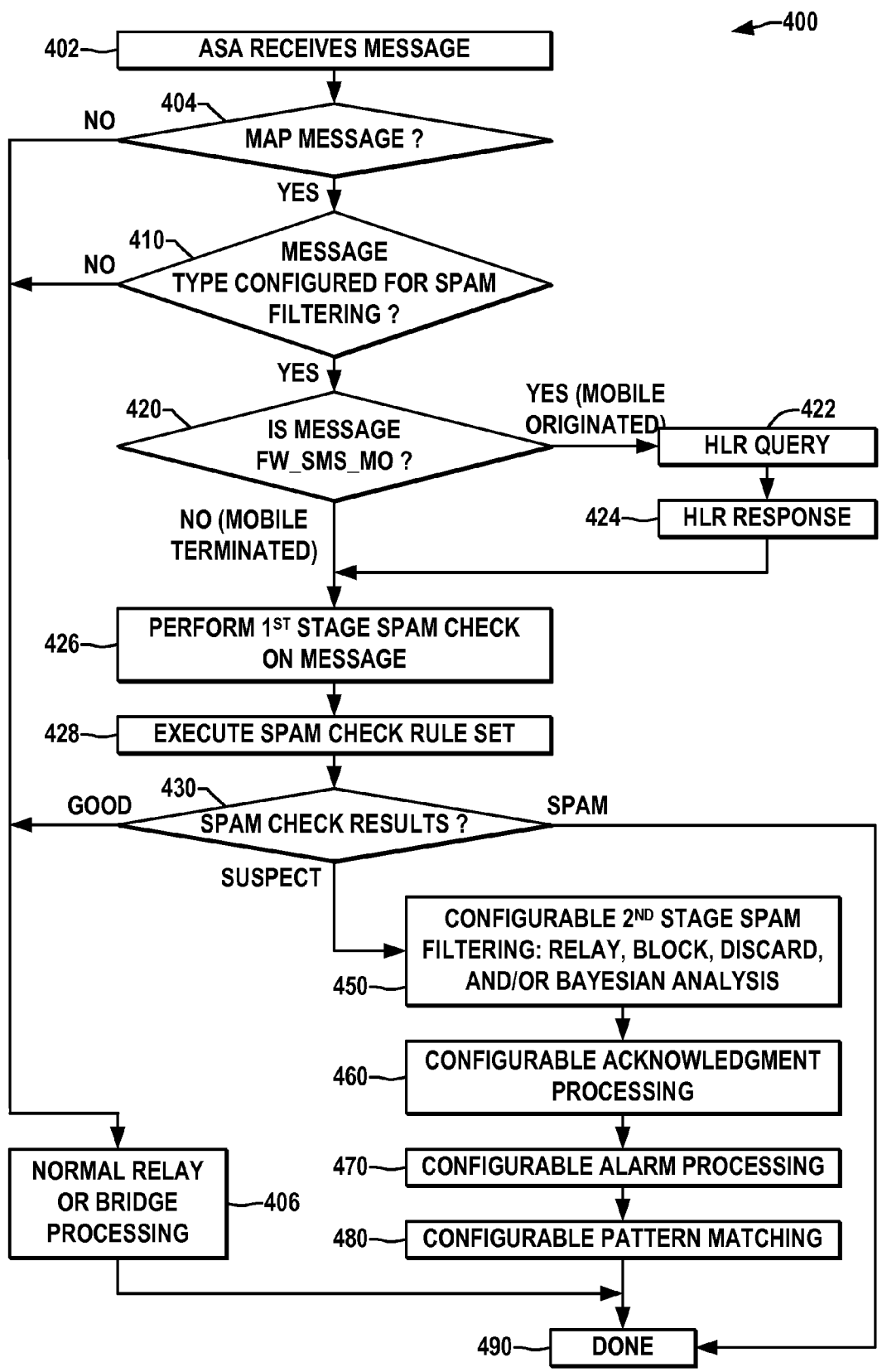
FIG. 7 is a flow diagram illustrating exemplary two-stage spam filtering using the exemplary MAP SMS spam filtering systems and methods for relay or bridge operation.

Referring now to FIG. 7, a simplified flow diagram 400 illustrates exemplary two-stage spam filtering in relay or bridge operation for the ASA 42, beginning at 402 with receipt of a network message by the ASA 42. An initial determination is made at 404 as to whether the message is a MAP message, and if not (NO at 404), the normal relay or bridge mode processing is performed at 406, such as forwarding the message to the desired destination, and the process 400 ends at 490. If the message is an MAP message (YES at 404), the application then determines at 410 whether the message type (e.g., SS7 MAP) is configured for spam filtering. If not (NO at 410), the process 400 proceeds as described above to perform the normal relay or bridge processing at 406, for instance, to provide the message to the appropriate MS-C 18. Otherwise (YES at 410), a determination is made at 420 as to whether the message is mobile originated (MO) or mobile terminated (MT). For mobile originated messages (YES at 420), the application queries the appropriate HLR at 422 and receives an HLR response at 424 and the process then proceeds to 426. For mobile terminated messages (NO at 420), the process 400 proceeds directly from 420 to 426. In either case, the first stage spam filtering processing is performed at 426, with the configured spam check rule set being executed at 420, and a determination is made at 430 as to whether the message is spam, suspected spam, or good SMS. If the message is found to be good (GOOD at 430), the process proceeds to 406 as described above for provision of the good SMS message to the appropriate destination, such as the SMSC 18 in certain examples for termination to the SMS destination. For messages determined at 430 to be spam (SPAM at 430), the process 400 proceeds to 490 without delivery of the spam SMS. For suspected spam messages (SUSPECT at 430), the configurable second stage spam checking is done at 450, whereat the application 42 can be configured to either relay, block, discard, or further analyze the suspected message using Bayesian filtering analysis in one implementation. Once the second stage is completed at 450, the message may undergo any configured acknowledgment processing at 460, configured alarm processing at 470, and/or configurable pattern matching at 480, and if spam, the message is discarded or persisted before the process 400 ends at 490.

Figure 8A:
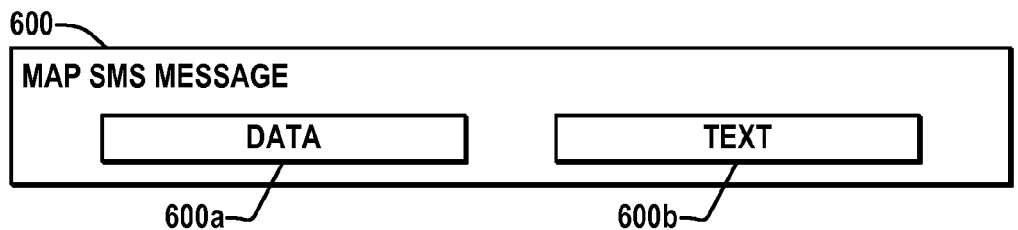
FIG. 8A is a simplified schematic diagram illustrating an exemplary MAP SMS message having data and text portions.
Figure 8B:
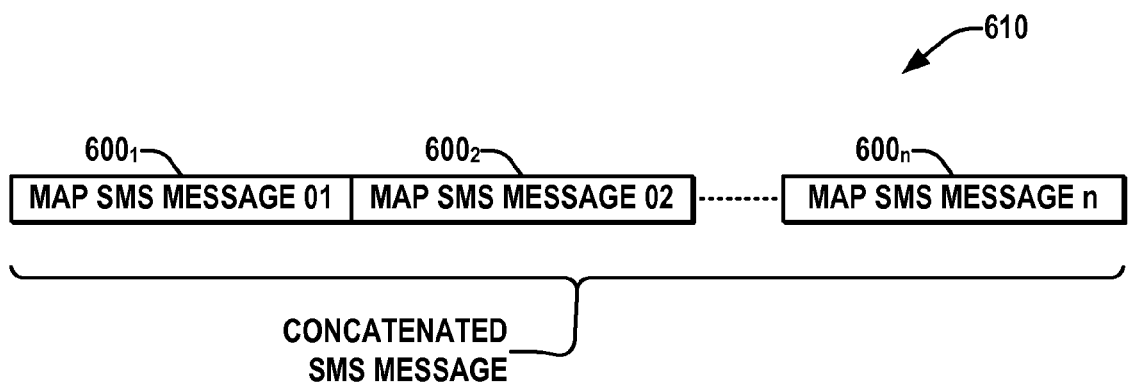
FIG. 8B is a simplified schematic diagram illustrating an exemplary concatenated MAP SMS message.
Figure 8C:
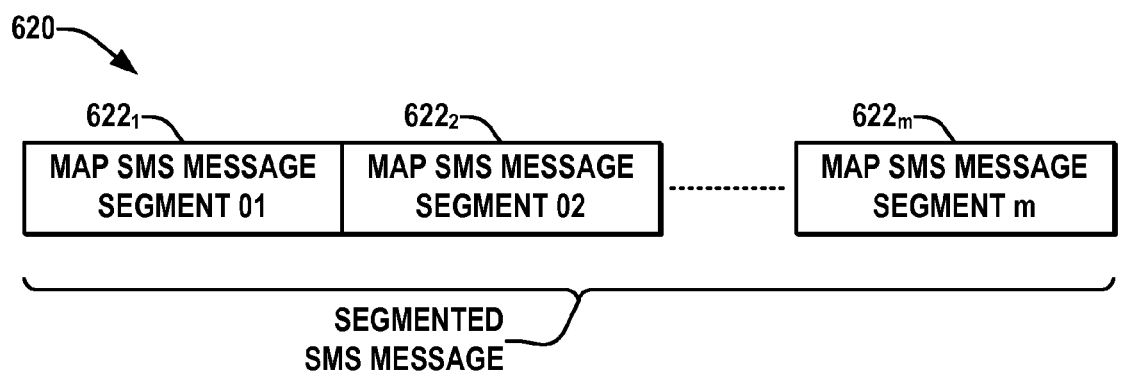
FIG. 8C is a simplified schematic diagram illustrating a segmented concatenated MAP SMS message.

Referring now to FIGS. 8A-8C, the ASA 42 is operative to process MAP messages 600 as shown in FIG. 8A which may include an optional data portion 600a as well as a text portion 600b. As shown in FIG. 8B, moreover, the system can support concatenated MAP SMS messages 610 including a plurality of SMS messages $600_{01}, 600_{02}, \ldots, 600_n$. In one mode of operation, the ASA 42 is configurable to individually classify the plurality of SMS messages $600_{01}, 600_{02}, \ldots, 600_n$ of the concatenated message 610 as suspected spam, spam, or good. In another possible embodiment, the ASA 42 is configurable to collectively classify the messages $600_{01}, 600_{02}, \ldots, 600_n$ of the concatenated message 610 as suspected spam, spam, or good. In one example, if any of the individual messages $600_{01}, 600_{02}, \ldots, 600_n$ are found to be spam, the entire concatenated message 610 is classified as spam. FIG. 8C shows another possibility, in which the ASA 42 can process a segmented concatenated MAP SMS message 620 wherein the message 620 is received in pieces or segments $620_{01}, 620_{02}, \ldots, 620_m$ from the network 10. In this case, the ASA 42 is operative when one or more segments of the concatenated message 620 are not received in a timely fashion from the SS7 network 10 to classify the message 62 as spam and to process the message accordingly. In another configurable mode of operation, the ASA 42 performs the spam filtering on the segments that are received, and to the extent possible, classifies the segmented concatenated message 620 as spam, spam, or good based on the analysis of the received ones of the segments $620_{01}, 620_{02}, \ldots, 620_m$.

While the invention has been illustrated and described with respect to one or more exemplary implementations or embodiments, equivalent alterations and modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary implementations of the invention. In addition, although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The invention claimed is:

1. A method for filtering spam SMS messages in a signaling system 7 (SS7) network, the method comprising:
   receiving Mobile Application Part (MAP) messages in an SS7 network;
   providing the MAP messages to an anti-spam application running on a network element;
   determining whether the MAP messages are short message service (SMS) messages;
   classifying MAP SMS messages as spam or good prior to providing the MAP SMS messages to an SMS center (SMSC) or switching element associated with the SS7 network;
   providing good MAP SMS messages to the corresponding destinations; and
   refraining from providing spam MAP SMS messages to corresponding destinations;
   wherein the MAP SMS messages include at least one concatenated message including a plurality of SMS messages, wherein at least some segments of the at least one concatenated message are not received, and wherein the received segments of the at least one concatenated message are classified as spam.

2. The method of claim 1, wherein the MAP SMS messages include at least one mobile originated SMS message.

3. The method of claim 1, wherein the MAP SMS messages include at least one mobile terminated SMS message.

4. The method of claim 1, wherein classifying the MAP SMS messages comprises:
   performing first stage spam filtering to classify the MAP SMS messages as spam, suspected spam or good; and
   performing second stage spam filtering on suspected spam messages to classify the messages as spam or good.

5. The method of claim 4,
   wherein performing first stage spam filtering includes:
   storing the MAP SMS messages in a message database associated with the anti-spam application; and
   evaluating a set of rules to classify the MAP SMS messages as suspected spam or good; and
   wherein performing second stage spam filtering comprises performing Bayesian filtering to classify the suspected spam messages as spam or good.

6. The method of claim 4, wherein the MAP SMS messages comprise data and text, wherein the first stage spam filtering is performed on the data and the text, and wherein the second stage spam filtering is performed on the text.

7. The method of claim 4, wherein performing second stage spam filtering comprises selectively performing at least one of configurable acknowledgment processing, configurable alarm processing, and configurable pattern matching.

8. The method of claim 1, wherein the plurality of SMS messages of the concatenated message are individually classified as spam or good.

9. The method of claim 1, wherein the plurality of SMS messages of the concatenated message are collectively classified as spam or good.

10. The method of claim 1, wherein at least some segments of the at least one concatenated message are not received, and wherein the received segments of the at least one concatenated message are classified as spam or good.

11. A system for filtering spam SMS messages in a signaling system 7 (SS7) network, comprising:
    means for receiving Mobile Application Part (MAP) messages in an SS7 network;
    means for providing the MAP messages to an anti-spam application running on a network element;
    means for determining whether the MAP messages are short message service (SMS) messages;

means for classifying MAP SMS messages as spam or good prior to providing the MAP SMS messages to an SMS center (SMSC) or switching element associated with the SS7 network;

means for providing good MAP SMS messages to the corresponding destinations; and means for refraining from providing spam MAP SMS messages to an SMS center associated with the SS7 network;

wherein the MAP SMS messages include at least one concatenated message including a plurality of SMS messages, wherein at least some segments of the at least one concatenated message are not received, and wherein the received segments of the at least one concatenated message are classified as spam.

12. A system for filtering spam SMS messages in a signaling system 7 (SS7) network, comprising:

a network element operatively coupled with the SS7 network to receive Mobile Application Part (MAP) messages; and an anti-spam application running on the network element to receive the MAP messages and to determine whether the MAP messages are short message service (SMS) messages, the application further operative to classify the MAP SMS messages as spam or good prior to providing the MAP SMS messages to an SMS center (SMSC) or switching element associated with the SS7 network, the anti-spam application operative to selectively provide good MAP SMS messages to the corresponding destinations and to refrain from providing spam MAP SMS messages to an SMS center (SMSC) associated with the SS7 network;

wherein the MAP SMS messages include at least one concatenated message including a plurality of SMS messages, wherein at least some segments of the at least one concatenated message are not received, and wherein the received segments of the at least one concatenated message are classified as spam.

13. The system of claim 12, wherein the MAP SMS messages include at least one mobile originated SMS message.

14. The system of claim 12, wherein the MAP SMS messages include at least one mobile terminated SMS message.

15. The system of claim 12, wherein the anti-spam application comprises:

a first component that performs first stage spam filtering to classify the MAP SMS messages as suspected spam, spam, or good; and a second component that performs second stage spam filtering on suspected spam messages to classify the messages as spam or good.

16. The system of claim 15, wherein the anti-spam application further comprises a message database for storing the MAP SMS messages; and a set of rules used by the first component to classify the MAP SMS messages as suspected spam, spam, or good; and wherein the second component performs Bayesian filtering to classify the suspected spam messages as spam or good.

17. The system of claim 12, wherein the anti-spam application is operative to selectively perform at least one of configurable acknowledgment processing, configurable alarm processing, and configurable pattern matching.

* * * * *

UNITED STATES PATENT AND TRADEMARK OFFICE
CERTIFICATE OF CORRECTION

PATENT NO. : 7,630,727 B2  
APPLICATION NO. : 11/427350  
DATED : December 8, 2009  
INVENTOR(S) : Cai et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 706 days.

Signed and Sealed this

Twenty-first Day of December, 2010

David J. Kappos  
*Director of the United States Patent and Trademark Office*